H. A. CLUM.
Illuminating Apparatus.
No. 198,276.  Patented Dec. 18, 1877.
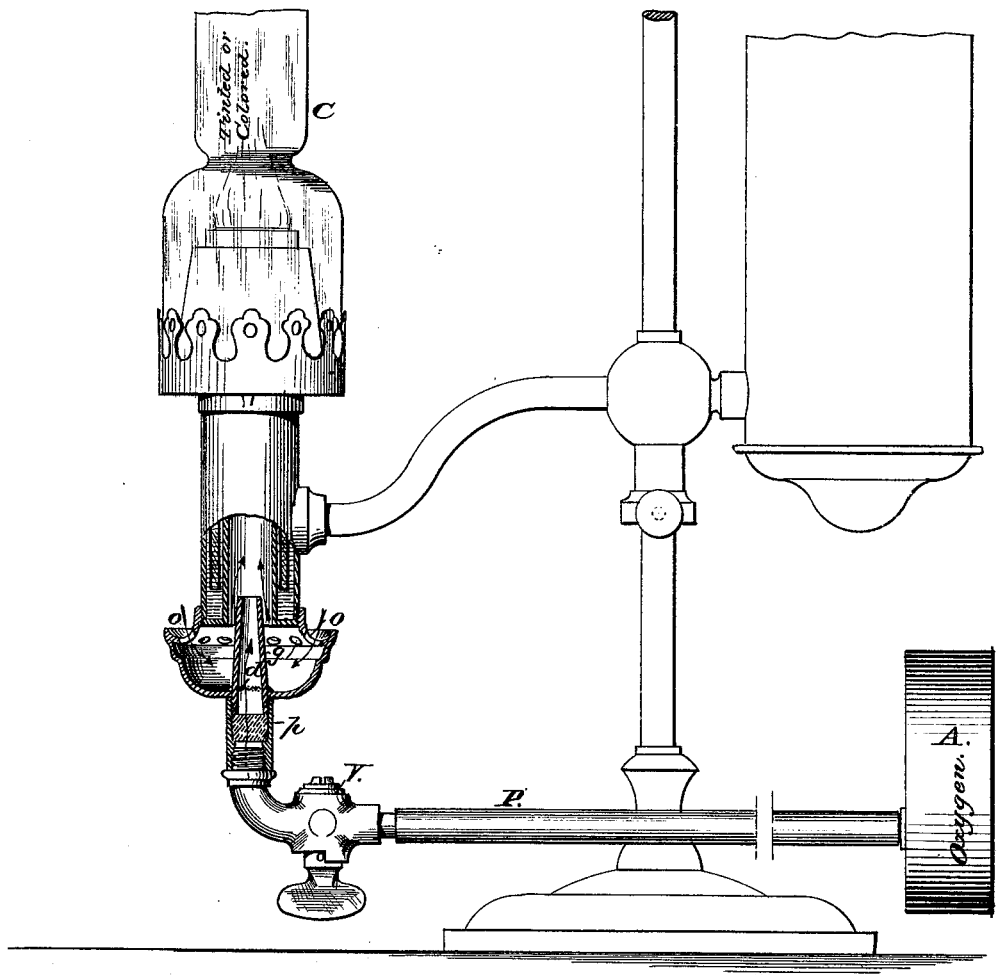

UNITED STATES PATENT OFFICE.

HENRY A. CLUM, OF NEW YORK, N. Y., ASSIGNOR TO CHARLES W. RHODES, AND SAID RHODES ASSIGNOR OF ONE-HALF HIS RIGHT TO CORNELIUS GODFREY, ALL OF SAME PLACE.

IMPROVEMENT IN ILLUMINATING APPARATUS.

Specification forming part of Letters Patent No. 198,276, dated December 18, 1877; application filed September 7, 1876.

*To all whom it may concern:*

Be it known that I, HENRY A. CLUM, of the city, county, and State of New York, have invented certain new and useful Improvements in Illuminating Apparatus, of which the following is a full, clear, and exact description, reference being had to the accompanying drawing, and to the letters of reference marked thereon.

The drawing represents a partial section and elevation of the well-known German student's lamp having my improvements applied thereto.

The object of my invention is, first, to increase the brilliancy and intensity of the ordinary hydrocarbon-oil light; and, second, to provide means for filtering out the non-actinic rays to adapt the intensified light for use in photographic operations.

It consists in certain combinations of parts to be hereinafter specified, and pointed out in the claims.

In the drawing, A is a reservoir for containing oxygen or superoxygenated air, which is conducted to the gas-tip $g$ through any suitable pipe, P, provided with a gas-cock or regulating-valve, V. The tip $g$ delivers the oxygen into the central air-chamber of the Argand burner at a point a trifle above the air-inlets $o\ o$, where it (the oxygen) mingles with the incoming currents of air and proceeds to the point of combustion.

This location of the gas-delivery I find to be the most advantageous and to give the best results, owing, doubtless, to the fact that it secures a longer chamber wherein the gas and air can become thoroughly mixed before being fed to the flame.

It is important that the flow of oxygen be so retarded as that it shall enter the mixing-chamber at about the same velocity as the incoming air; for if too great a current be permitted, an undue supply of oxygen results, and the flame becomes too much attenuated.

When the ordinary flexible bag is employed to contain the gas, and the same is not under pressure, the proper degree of velocity usually results, and no regulating contrivance is necessary; but if the gas be held under pressure, such device becomes essential. To provide this I place at any convenient point between the gas-holder and the tip $g$ a finely-perforated diaphragm, as $d$, or a packing of porous material, as $p$, through which the gas is compelled to pass before entering the mixing-chamber. For this retarding agent I contemplate the use of asbestus, pumice-stone, comminuted glass, or any substance which will give, as do these, a series of very minute channels through which the gas is filtered, and by which it is of necessity compelled to flow in an even and gentle current.

As thus arranged in connection with an Argand burner to which hydrocarbon-oils are supplied, my apparatus gives a very brilliant and intense light, peculiarly adapted for use in situations where an exceedingly brilliant flame is desirable, as in light-houses, locomotive headlights, signal-lights, stereopticons, halls, churches, &c. The light thus produced is found to resemble the solar light in a remarkable degree, and it is therefore particularly adapted for photographic purposes, to which use all previous attempts have failed to adapt the hydrocarbon-oil flame.

To further perfect the lamp for this object, I place upon it a tinted or colored chimney, C, for the purpose of filtering out the non-actinic rays of light, and am thus enabled to produce a lamp by use of which photography may be carried on independently of the solar light, and at an expense very much less than by any other artificial light known to me.

To illustrate the invention I have chosen the German student's lamp to which to apply my improvements. This lamp is selected merely as a type of that class wherein the burners are well removed from the oil-chambers, and thus the dangers from overheating are very much diminished. With so intense a flame, of course I produce a considerable heat, and I prefer to use the above class of lamps; but it is obvious that the principles of my invention may be applied to any lamp, and that the burner may be of the Argand or of the flat-wick pattern, it being only necessary that oxygen or superoxygenated air be mingled with the incoming air, and the thoroughly-mingled gases fed to the flame in a moderate and well-regulated current.

The oxygen, being introduced at a point below that of combustion, permits the air-inlets to be always left open, whereby overheating of the lamp is avoided. The attachment may therefore be turned off without affecting the burning of the lamp; and when the light is not required to be so powerful, the flow of gas may be easily and economically regulated accordingly. For a locomotive head-light this is of great advantage, since the strongest attainable light is not always necessary; and the same is obviously true of other lights wherein the power required is variable, depending upon circumstances of time and place.

The high grades of oil are found to give the best results.

The light may be adapted to domestic uses by employing, in connection with devices herein explained, any of the ordinary shades or painted globes.

I am fully aware of certain attempts to introduce a current of air under pressure very near the point of combustion in lamps burning kerosene oil, and also that common coal-gas has been fed to the flames of oil-lamps at the same point. In both these cases exist a deficiency in the quantity of oxygen supplied, and a defect in the position at which the supplementary fluid-jet mingles with the usual draft-current, which current is also so much increased as to prevent the proper and most advantageous consumption of carbon.

Having now fully described my invention, what I claim as new, and desire to secure by Letters Patent, is—

1. The combination, as before set forth, of a reservoir containing oxygen or superoxygenated air, a gas-tip having its mouth located within the mixing-chamber, above the air-inlets and below the point of combustion, and a lamp-burner.

2. The combination, as before set forth, of a reservoir containing oxygen or oxygenated air, a gas-tip having its mouth located within the mixing-chamber, above the air-inlets and below the point of combustion, a lamp-burner, and a tinted or colored chimney.

3. The process herein indicated of increasing the power of the ordinary hydrocarbon-oil flame—viz., by mingling a jet of oxygen or superoxygenated air with the ordinary air-currents at a point below that of combustion, and conducting the mingled gases to the flame in the manner described.

In testimony that I claim the foregoing I have hereunto set my hand in the presence of two witnesses.

HENRY A. CLUM.

Witnesses:
B. J. DOURAS,
J. F. HEULLER.